US007222862B2

(12) United States Patent
Buchholz et al.

(10) Patent No.: US 7,222,862 B2

(45) Date of Patent: May 29, 2007

(54) TOOL HOLDER

(75) Inventors: Achim Buchholz, Limburg (DE); Ralf Bernhart, Idstein (DE)

(73) Assignee: Black & Decker Inc., Newark, DE (US)

( * ) Notice: Subject to any disclaimer, the term of this patent is extended or adjusted under 35 U.S.C. 154(b) by 46 days.

(21) Appl. No.: 10/493,922

(22) PCT Filed: Oct. 25, 2002

(86) PCT No.: PCT/EP02/11928

§ 371 (c)(1),
(2), (4) Date: Oct. 7, 2004

(87) PCT Pub. No.: WO03/035330

PCT Pub. Date: May 1, 2003

(65) Prior Publication Data

US 2006/0006614 A1 Jan. 12, 2006

(30) Foreign Application Priority Data

Oct. 26, 2001 (GB) ................................ 0125749.2
May 16, 2002 (GB) ................................ 0211184.7

(51) Int. Cl.
*B23B 31/02* (2006.01)
*B25D 17/08* (2006.01)

(52) U.S. Cl. ...................... 279/19.3; 279/19.6; 173/29; 173/132; 144/136.95; 144/154.5; 403/DIG. 11; 403/27; 403/365

(58) Field of Classification Search ................. 173/29, 173/132, 48, 176; 403/27, 365, 366, DIG. 7, 403/DIG. 11; 279/19, 19.2, 19.3, 19.6, 71, 279/75, 78, 81, 905, 19.4; 408/239 R–240; 409/178–182; 16/2.1; 144/136.95, 154.5
See application file for complete search history.

(56) References Cited

U.S. PATENT DOCUMENTS

| | | | | |
|---|---|---|---|---|
| 2,829,685 | A * | 4/1958 | Mitchell et al. | 81/451 |
| 3,071,800 | A * | 1/1963 | Patriquin | 16/66 |
| 4,049,357 | A * | 9/1977 | Hamisch, Jr. | 403/209 |
| 4,913,449 | A * | 4/1990 | Rohm | 279/60 |
| 5,145,193 | A * | 9/1992 | Rohm | 279/62 |
| 5,437,465 | A * | 8/1995 | Vogele et al. | 279/22 |

(Continued)

FOREIGN PATENT DOCUMENTS

| | | | |
|---|---|---|---|
| EP | 1477254 | A1 * | 11/2004 |
| GB | 2102718 | A * | 2/1983 |
| GB | 2309404 | A * | 7/1997 |

*Primary Examiner*—Monica Carter
*Assistant Examiner*—Michael W. Talbot
(74) *Attorney, Agent, or Firm*—Michael P. Leary; Charles E. Yocum; Adan Ayala

(57) ABSTRACT

A tool holder for a power tool, in particular a drilling and/or hammering tool comprising a manually actuable sleeve (40) wherein components of the tool holder are held within the sleeve by a snap ring (100) which snap ring is fitted within the sleeve. The snap ring has at least one resilient arm (102) and the sleeve has a corresponding number of through holes (105) which extend to a radially outwardly facing surface of the sleeve, arranged such that the or each arm is engageable with a corresponding through hole in a snap fit. Each arm and through hole cooperate so that the portion (104) of the or each arm which can be viewed from the radially outwardly facing surface of the sleeve appears in the shape of a symbol. Thus, the snap ring (100) has the dual function of maintaining components, such as a locking ring (42) within the sleeve (40) and of providing an external indication to a user of how to actuate the sleeve.

14 Claims, 2 Drawing Sheets

U.S. PATENT DOCUMENTS 5,829,761 A * 11/1998 Rohm .......................... 279/62
5,882,016 A * 3/1999 Chiang ........................ 279/62
6,053,675 A * 4/2000 Holland et al. ......... 408/239 R
6,089,331 A * 7/2000 Christ ........................ 173/216
6,209,208 B1 * 4/2001 Marinkovich et al. ........ 30/392
6,668,941 B2 * 12/2003 Phillips et al. ............. 173/93.5
6,725,548 B1 * 4/2004 Kramer et al. ................ 30/392
6,860,488 B2 * 3/2005 Mack .......................... 279/62
6,913,089 B2 * 7/2005 Stirm ......................... 173/104
2003/0020242 A1 * 1/2003 Mack .......................... 279/60
2004/0108662 A1 * 6/2004 Sakamaki et al. ............ 279/62
2005/0161890 A1 * 7/2005 Yang et al. ................... 279/62

* cited by examiner

FIG. 2
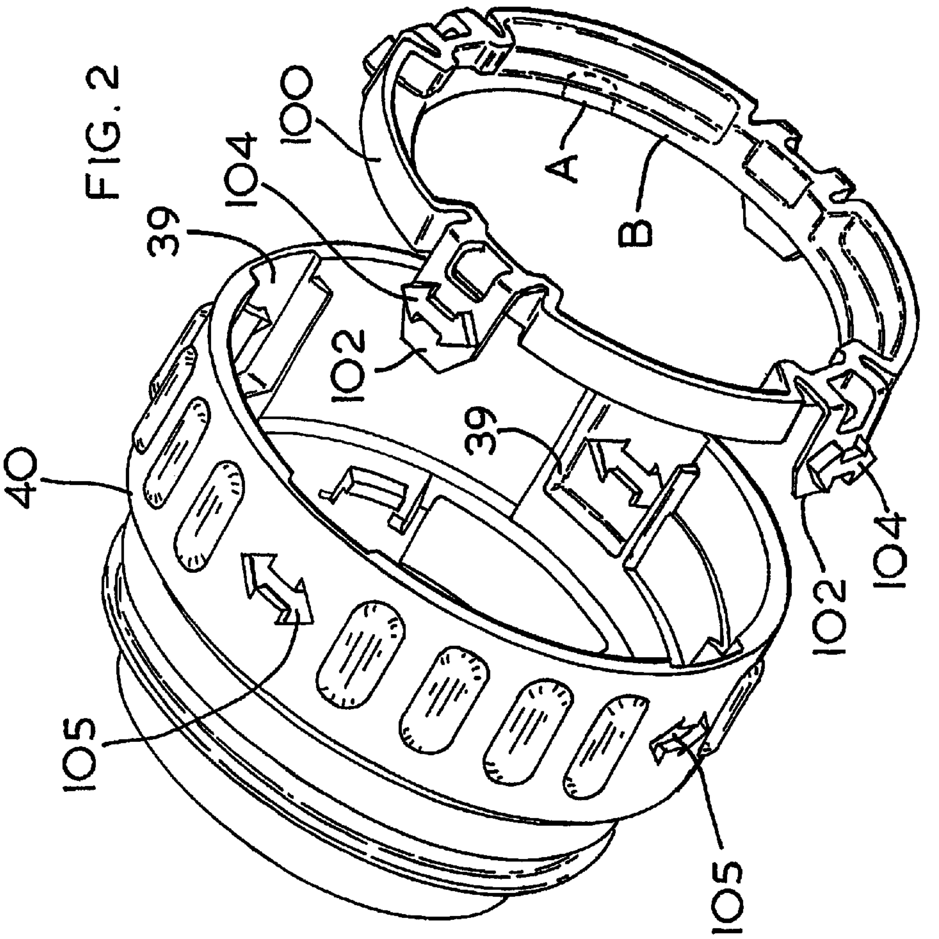
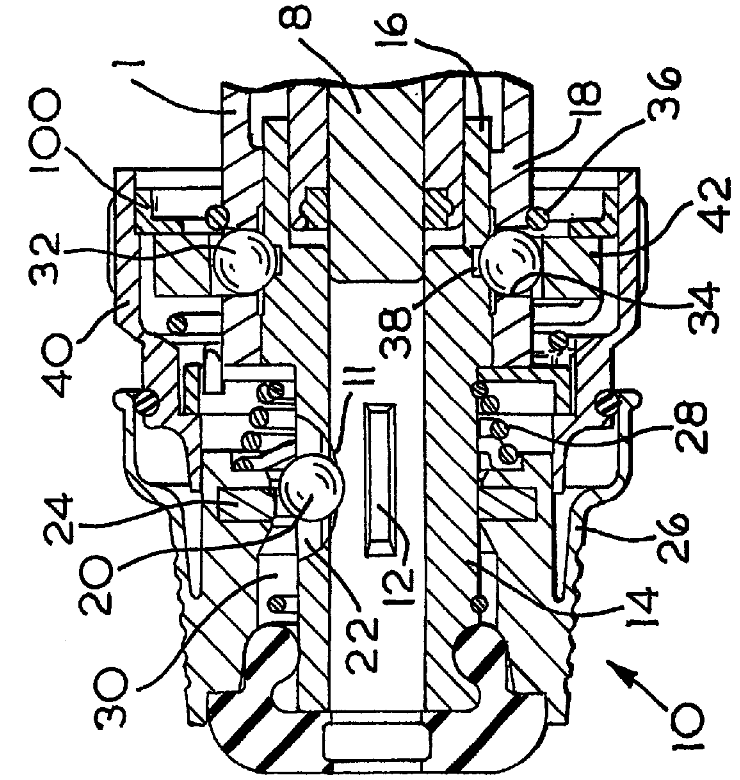
FIG. 1

TOOL HOLDER

This invention relates a tool holder for a power tool, in particular a drilling and/or hammering tool.

Such tool holders are mounted at the forward end of the drilling and/or hammering tool and are arranged to releasably lock a tool or bit within them. In a drilling tool or in a hammering tool with a rotary mode, the tool holder will generally be rotatingly driven, for example by a spindle of the hammering and/or drilling tool, and the tool holder will rotatingly drive the tool or bit locked within it. Where the tool holder is used on a hammering tool, the tool or bit is mounted within the tool holder so as to be able to undergo limited reciprocation and during operation in a hammering mode, a hammering mechanism of the hammer will impart repeated impacts to the tool or bit mounted within the tool holder. Mechanisms including a manually axially slideable actuating sleeve and/or a manually rotatable actuating sleeve are well known in the art on tool holders for enabling locking or release of a tool or bit within a tool holder.

The tool holder itself often will need to be capable of being released from the drilling and/or hammering tool in order to allow it to be changed, for example when a different type of tool or bit is to be held in the hammer. In this case the tool holder body or a spindle of the drilling and/or hammering tool is provided with one or more locking elements, for example locking balls, that are movable in a radial direction (with respect to the axis of the spindle) to retain the tool holder body on the spindle, or to allow release of the tool holder body therefrom. Mechanisms including a manually axially slideable actuating sleeve and/or a manually rotatable actuating sleeve are well known in the art on tool holders for enabling locking or release or relative rotation of a tool holder with respect to a spindle of the hammer. It should be noted that such actuating sleeves may remain on the spindle of a drilling and or hammering tool when the remainder of the tool holder is removed from the spindle.

It is often required to provide an axial end stop within tool holder actuating sleeves for fixing components of the tool holder within the sleeves. Such axial end stops are generally provided by using circlips. Circlips are fitted within an annular recess formed within the radially inwardly facing surface of an actuating sleeve, so that a portion of the circlip extends radially inwardly of the radially inwardly facing surface of the sleeve. However, circlips are difficult to assemble and if they are assembled incorrectly, they can prevent the tool holder from operating correctly and can cause damage to components of the tool holder.

Also, it is often required to mark the external surface of a tool holder actuating sleeve with symbols indicating, for example, the direction in which the sleeve is moveable or a locked position of the sleeve. These markings may be provided by painting or by making the markings in a contrasting colour to the colour of plastic of the actuating sleeve.

According to the present invention there is provided a tool holder for a power tool, in particular a drilling and/or hammering tool comprising a manually actuable sleeve wherein components of the tool holder are held within the sleeve by a snap ring which ring is fitted within the sleeve, characterised in that the snap ring has at least one resilient arm and the sleeve has a corresponding number of recesses formed on its radially inwardly facing surface which recesses can be viewed from a radially outwardly facing surface of the sleeve, arranged such that the or each arm is engageable with a corresponding recess in a snap fit, and the portion of the or each arm which can be viewed from the radially outwardly facing surface of the sleeve is in the shape of a symbol. Thus, the snapring has the dual function of maintaining components within the manually actuable sleeve and of providing an indication of an instructive symbol or icon on the external surface of the manually actuable sleeve which is informative to the user of the drilling and/or hammering tool. For this purpose the shape of the symbol or the outline of the shape may be formed in a contrasting colour to the colour of the external surface of the sleeve. In particular the snap ring may be made from a material, for example a plastics material, of a different colour to the colour of material, for example a plastics material, from which the sleeve is made.

In a preferred embodiment at least the radially outermost part of the or each recess is formed in the shape of the symbol. It is also preferred that the radially outermost part of the or each arm is formed in the shape of the symbol to fit the corresponding recess.

In order to be viewed from the radially outwardly facing surface of the manually actuable sleeve, the recesses may comprise a through hole which extends to the radially outwardly facing surface of the sleeve. Alternatively, a transparent cover could surround the radially outermost portion of the recesses. To effectively fit the snap ring to the manually actuable sleeve, it is preferred that the or each resilient arm is formed with a latch element in the shape of the symbol and the latch element is received in a snap fit within a correspondingly shaped recess. The snap fit between each resilient arm and the corresponding recess may be reinforced by fitting a peg element in a space located radially inwardly of the resilient arm.

The symbol, may be for example, an arrow designating the direction in which the manually actuable sleeve can be moved.

The manually actuable sleeve may be actuable to fit and/or remove a tool or bit from the tool holder and/or the manually actuable sleeve may be actuable to fit, remove or rotate the tool holder relative to a power tool.

According to the present invention there is also provided a drilling and/or hammering tool comprising a spindle on which a tool holder of the type described above is fitted. The tool may be a hammering tool wherein the tool holder can be rotatingly driven by the spindle and the spindle contains a hammering mechanism which can generate repeated impacts on a rearward end of a tool or bit mounted within the tool holder.

One form of tool holder in accordance with the present invention will now be described by way of example, with reference to the accompanying drawings, in which:

FIG. 1 is a longitudinal cross-section of a tool holder according to the present invention mounted on the forward end of a spindle of a rotary hammer;

FIG. 2 is a disassembled perspective view of a manually operated sleeve of the tool holder of FIG. 1.

Figure 3:
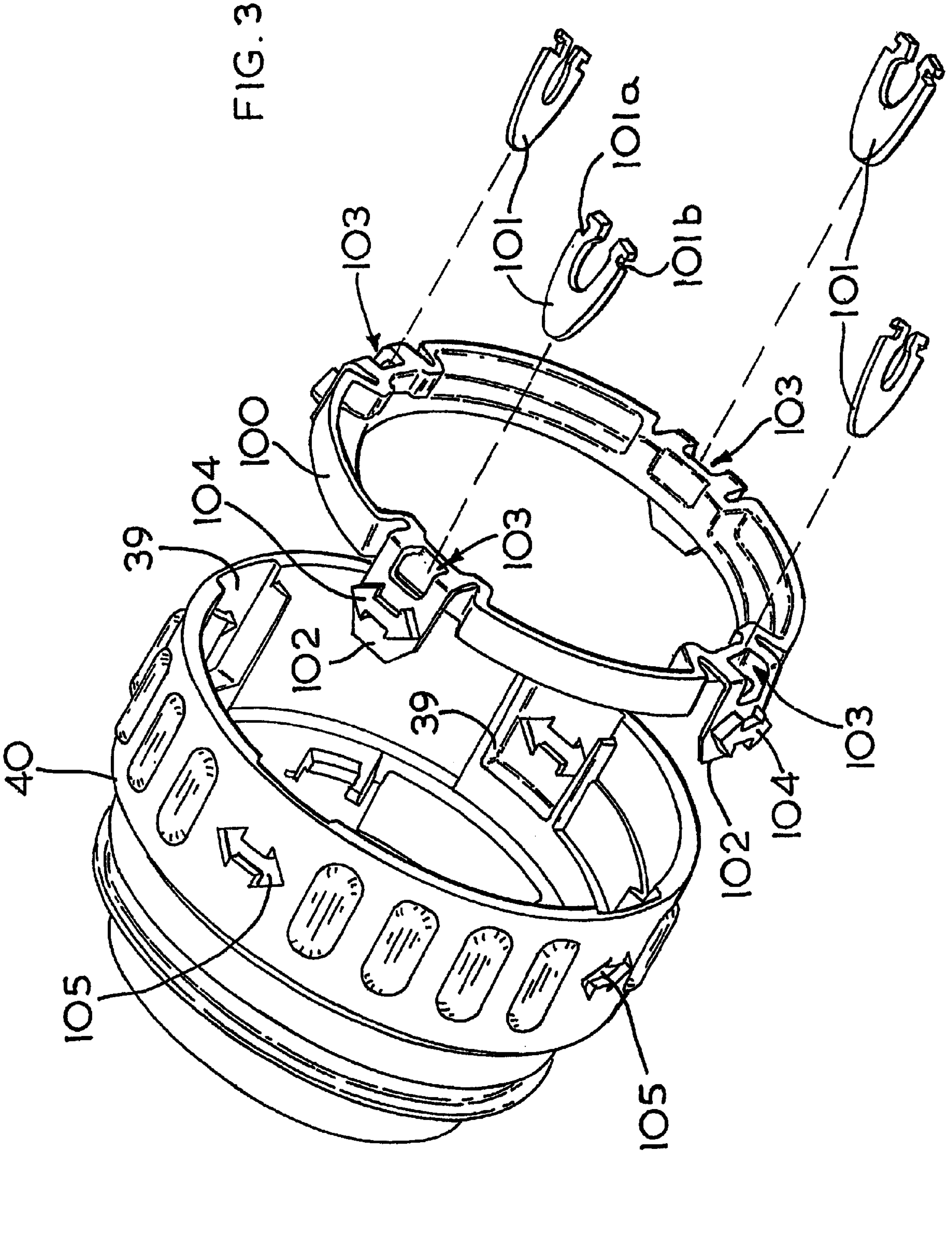
FIG. 3 is a disassembled perspective view on an alternative embodiment of a manually operated sleeve of the tool holder of FIG. 1.

FIG. 1 shows a tool holder that can be releasably mounted at the forward end 18 of a spindle 1 of a rotary hammer. The hammer includes a spindle 1 that is provided with an air-cushion hammer mechanism comprising a piston, that is caused to reciprocate within the spindle by a swash or wobble mechanism driven by a motor. Reciprocating motion of the piston causes a ram to reciprocate, which strikes a beatpiece 8. The beatpiece 8 strikes the shank of a drill or chisel bit (not shown) that is held in the bore of the tool holder 10 in known manner. In a combination rotary hammer mode, the tool holder 10 is also rotatingly driven by the spindle 1. Such hammers are well known in the art.

The tool holder 10 as shown is designed to hold a bit that has a pair of closed-end elongate recesses for receiving a locking element 20 for retaining the bit in the tool holder while allowing some degree of axial movement, and a pair of open-ended grooves for receiving rotary driving splines 12, such bits being of a design referred to as "SDS Plus", but tool holders for other designs such as SDS Max, hex shank etc. may also be employed. The tool holder includes a hollow, generally cylindrical tool holder body 14 that has a rearward end 16 that can be inserted into the forward end 18 of the hammer spindle 1. A locking ball 20 for retaining a tool or bit in the tool holder 10 is located in an elongate aperture 22 in the tool holder body 14, and is held in a position in which it extends into the bore of the tool holder body 14 (and into the recess of any bit held therein) by means of locking ring 24. The locking ring 24 is located in an axially slidable release sleeve 26 which can be moved rearwardly against the bias of a spring 28 to allow the locking ball 20 to move radially outwardly into recess 30 in order to allow removal of the bit.

The tool holder body 14 is held in the spindle 1 by means of four locking balls 32 located in apertures 34 in the spindle wall. The apertures 34 are slightly tapered in order to prevent the balls falling into the bore of the spindle 1, and the balls are held in the apertures by means of a snap ring 36. The locking balls 32 can move to a limited extent in the radial direction between a radially outermost position which allows attachment and removal of the tool holder 10, and a radially innermost position in which the tool holder is retained on the spindle. The tool holder body 14 has four depressions 38 in its outer surface for receiving the locking balls 32 when the tool holder 10 is retained on the spindle.

The tool holder 10 is provided with a manually operable sleeve 40 that can be rotated about the tool holder body 14 to a limited extent, and which houses a locking ring 42 that is positioned about the locking balls 32, and is held in the sleeve 40 by a snap ring 100. In a first rotational position of the locking ring 42 with respect to the locking balls (position shown in FIG. 1) the tool holder 10 is locked on the spindle 1. In a second rotational position of the locking ring 42 with respect to the locking balls, pockets in the locking ring 42 are aligned radially outwardly of the locking balls 32. This enables the locking balls 32 to move radially outwardly to allow insertion of the tool holder main body 14 completely into the forward end 18 of the spindle or to allow removal of the tool holder main body 14 from the forward end 18 of the spindle. The sleeve (40) is manually rotated by a user to rotate the locking ring (42) between the first and second rotational positions.

The locking ring 42 is held within the interior of the sleeve 40 by means of a retention or snap ring 100 having a generally "L" shaped circumferential cross-section. The retention ring 100 is provided with four resilient flap or arm portions 102 which fit inside a corresponding recess 39 formed in the interior of the sleeve 40. Each flap portion 102 is provided with a small protuberance 104, as shown in the shape of a double-headed arrow. The protuberances 104 will snap fit due to the resilience of the flap portions 102 inside a correspondingly shaped through hole 105 in the wall of the sleeve in order to provide a positive engagement of the retention ring 100 in the sleeve 40. The snap ring 100 is made from a plastics material made of a first colour and the sleeve 40 is made from a plastics material of a second contrasting colour and so the double headed arrows 104 formed on the snap ring 100 can be viewed from the exterior of the sleeve to inform a user that the sleeve 40 is actuated by rotating it.

In the above embodiment the snap ring 100 is used in relation to an actuating sleeve 40 which is actuable to enable the tool holder to be mounted on or removed from the spindle 1 of the hammer. The snap ring has the dual function of fixing the locking ring 42 within the sleeve 40 and of providing an external indication on the sleeve 40 to a user that the sleeve is actuable by rotation.

Such a snap ring can also be used in an actuating sleeve which is actuable to enable a relative rotation between the tool holder and a spindle of a hammering tool in order to move the tool holder to a desired orientation with respect to the hammer.

Such a snap ring can also be used on a tool release sleeve, of a type similar to the sleeve 26, which is actuable to enable insertion of a tool or bit into the tool holder and/or removal of a tool or bit from the tool holder. The snap ring could again have a dual function, in this case of providing an axial end stop for fixing components within the tool release sleeve and for providing an external indication of the direction in which the tool release sleeve is actuable. For a tool release sleeve which is axially slideable on the tool holder main body 14 , then the protruberances 104 on the resilient flap portions 102 and the correspondingly shaped through holes in the tool release sleeve would be formed as double headed arrows pointing in a direction parallel to the longitudinal axis of the tool holder main body 14.

It should further be noted that it is known to have a tool holder which is removeably mounted on the spindle of a hammer comprising a manually actuable sleeve which is actuable to fit the tool holder on the spindle or remove the tool holder from the spindle, in which the actuating sleeve remains on the spindle when the remainder of the tool holder is removed. Such an actuating sleeve may also be provided with a snap ring of the type described above, which snap ring provides the dual function of maintaining components within the actuating sleeve and providing an external indication to a user of how the actuating sleeve is actuated.

An alternative design to that shown in FIG. 2 is shown in FIG. 3, with like parts identified by like numerals. Again a retention ring 100 is provided with four resilient flap or arm portions 102 which fit inside a corresponding recess 39 formed in the interior of the sleeve 40. The protuberances 104 will snap fit due to the resilience of the flap portions 102 inside a correspondingly shaped through hole 105 in the wall of the sleeve in order to provide a positive engagement of the retention ring 100 in the sleeve 40. A set of pegs 101 are provided, with one peg for each resilient arm portion 102 in order to reinforce the positive engagement between the retention ring 100 and the sleeve 40. After the snap ring 100 has been snap fitted into place within the sleeve 40 the pegs are inserted axially (with respect to the axis of the tool holder 10) through a hole 103 provided in each arm portion and into a space between each arm portion 102 and the main body of the ring 100. The pegs 101 are U-shaped and are made of a resilient material and the pegs are elastically deformed by moving the arms of each U-shaped peg together in order to fit the pegs through the holes 103. Once the pegs are position through the holes 103 and the arms of the peg are released, the pegs resume their usual shape and a pair of rearwardly facing shoulders 101*a*, 101*b* on each peg engage the edge of the holes 103 in the arm portions 102 in order to hold the pegs 101 in place. The pegs 101 limit the radially inward movement of the arm portions 102 towards the main body of the snap ring and so reinforce the connection between the snap ring 100 and the sleeve 40.

The invention claimed is:

1. A tool holder for a power tool comprising, a locking element movable between a locked position and an unlocked position;

a manually actuable sleeve movable to a first position, wherein the locking element is in the locked position, and a second position, the sleeve defining a radially extending through hole; and a snap ring fitted within the sleeve, and the snap ring includes a resilient arm, and the resilient arm includes a first portion having a radially outward surface and bears a symbol on the radially outward surface, and the snap ring is arranged such that the first portion of the arm is engaged inside the through hole in a snap fit, and the symbol is visible to a user of the tool holder.

2. A tool holder according to claim 1 wherein the symbol is a first colour and the sleeve includes an external surface of a second colour.

3. A tool holder according to claim 1 wherein the snap ring is made of a material of a first colour and the sleeve is made of a material of a second colour.

4. A tool holder according to claim 3 wherein the snap ring and the sleeve are made of plastics material.

5. A tool holder according to claim 1 wherein the through hole includes a radially outermost portion formed in the shape of the symbol.

6. A tool holder according to claim 5 wherein the symbol is formed as a raised surface on the first portion of the arm and is sized to fit the radially outermost portion of the through hole formed in the shape of the symbol.

7. A tool holder according to claim 1 wherein the first portion of the resilient arm is a latch element.

8. A tool holder according to claim 1 wherein the symbol is an arrow designating a direction in which the manually operable sleeve can be moved.

9. A tool holder according claim 1 wherein the manually actuable sleeve is actuable to one of fit and remove one of a tool and bit from the tool holder.

10. A tool holder according to claim 1 wherein the manually actuable sleeve is actuable to one of fit the tool holder to the power tool, to remove the tool holder from the power tool, and to rotate the tool holder to a desired orientation with respect to the power tool.

11. A tool holder according to claim 1 and further including a peg element in a space located radially inward of the resilient arm for keeping the resilient arm engaged in the through hole.

12. A drilling and/or hammering tool comprising:

a spindle (1);

a tool holder attached to the spindle and including:

a locking element movable between a locked position and an unlocked position;

a manually actuable sleeve movable to a first position, wherein the locking element is in the locked position, and a second position, the sleeve defining a radially extending through hole; and a snap ring fitted within the sleeve, and the snap ring includes a resilient arm, and the resilient arm includes a first portion having a radially outward surface with a symbol on the radially outward surface, and the snap ring is arranged such that the first portion of the arm is engaged inside the through hole in a snap fit, and the symbol is visible to a user of the tool holder.

13. A drilling and/or hammering tool according to claim 12 the manually actuable sleeve remains on the spindle when the remainder of the tool holder is removed from the spindle.

14. A hammering tool according to claim 12 wherein the tool holder can be rotatingly driven by the spindle and the spindle contains a hammering mechanism which can generate repeated impacts on a rearward end of a tool or bit mounted within the tool holder.

* * * * *